United States Patent [19]
Miller

[11] 3,870,996
[45] Mar. 11, 1975

[54] JAMMING CANCELLATION DEVICE
[75] Inventor: Raymond B. Miller, Glencoe, Ill.
[73] Assignee: The United States of America as represented by the Secretary of the Navy, Washington, D.C.
[22] Filed: Sept. 16, 1963
[21] Appl. No.: 309,358

[52] U.S. Cl................. 343/18 E, 325/324, 325/476
[51] Int. Cl............................ H04b 1/12, H04k 3/00
[58] Field of Search .......... 343/6.5, 6.8, 18, 100.12, 343/17.1, 5, 7.7; 325/473–476, 321–324, 3

[56] References Cited
UNITED STATES PATENTS

| 3,007,156 | 10/1961 | Barber | 343/100.12 |
|---|---|---|---|
| 3,019,433 | 1/1962 | White | 343/18 E |
| 3,095,565 | 6/1963 | Schelisch | 343/18 E |
| 3,117,313 | 1/1964 | Mortley | 343/17.1 |
| 3,155,966 | 11/1964 | Allen | 343/100.12 |
| 3,160,884 | 12/1964 | Harris et al. | 343/6.8 |

Primary Examiner—Malcolm F. Hubler
Attorney, Agent, or Firm—R. S. Sciascia; Claude Funkhouser

[57] ABSTRACT

5. A method of canceling out interfering modulations present in a radar video signal without causing degradation to the desired signal information comprising the steps of:
inverting the polarity of a video signal that has interfering modulations present;
delaying the polarity inverted video signal by manual adjustment equal to or greater than one-half the period of the lowest interfering modulation signal frequency; and
adding the delayed and polarity inverted signal to an undelayed video signal in proper phase relationship with each other to effect complete cancellation of the interfering modulations.

5 Claims, 3 Drawing Figures

PATENTED MAR 11 1975　　3,870,996

INVENTOR
RAYMOND B. MILLER

BY Claude Funkhouser
ATTORNEY

JAMMING CANCELLATION DEVICE

This invention relates to improving the performance of radar receivers and more particularly to a circuitry network apparatus and method for improving the discernibility of target signal information in a jamming or interfering signal environment.

With the advent of every improved military radar system there is an equally improved anti-radar system manufactured to reduce or destroy the effectiveness of the improved radar system. As soon as the improved radar system becomes ineffective because of jamming techniques employed by anti-radar systems, new techniques are employed in radar receiving systems to overcome or eliminate the jamming signals. This represents a never ending contest in military radar design as one system labors to become superior to the other.

One type of anti-radar technique which has been found to be very troublesome in the past is the automatic jamming system which may take the form of producing strong signals that are modulated with periodic waveforms. Such interfering signals are operated close to or on the radar system frequency and have transient pulses which have frequency components in the frequency range accepted by the receiver. These interfering signals are usually very powerful and of much greater signal strength than the target echo signal return in order to mask or obscure the target echo signal return information. If the interfering signal is modulated at a low frequency or occurs in pulses of long duration, it is necessary to increase and decrease the gain of the receiver echo detection circuits in response with the amplitude variations of the interference wave in order to eliminate the interfering signal. Since this requires rapid variation of gain, which is impossible by manual control, special circuitry is necessary in the radar system to obtain this result.

The best known technique, prior to this invention, was the use of special corrective circuitry networks in the radar system known to those skilled in the art as automatic back bias, or instantaneous automatic gain control. Each of these techniques attempt to control or vary the gain of the radar receiver by producing a negative direct voltage that varies in magnitude with the amplitude of the interfering signal and this voltage is used to vary the gain of the receiver in such a way as to reduce the gain to the interfering signal more than the gain to the desired echo signal. The main disadvantage of these two techniques is their limitation with respect to the maximum frequency that the systems are capable of countering, since the gain to the target echo signal may also be reduced if the corrective circuits frequency response is extended into the range of the target echo signal frequency.

With the present invention apparatus, the above interfering signals are overcome by simple and economical means since cancellation of the interfering signal occurs by providing two paths for the video signal which contains both the interfering and target echo information signal and combining the two video signals in proper phase relationship with one another to completely cancel any periodic interference present.

An object of this invention is the provision of an apparatus for the suppression of jamming or interfering signals in a radar system.

Another object of this invention is the provision of an apparatus in a radar receiver for providing substantially complete cancellation of interfering or jamming signals without reducing the gain of the desired echo signal.

A further object of the present invention is to provide a circuitry network in a radar system which will eliminate interfering signals that are synchronized to the radar signal.

It is still another object of this invention to provide an improved radar circuitry network which allows the radar to operate effectively in jamming environments.

Still another object of this invention is the provision of an improved radar circuitry whereby any interfering modulations having different or the same frequency and/or phase relationship with the target echo signal can be suppressed without degradation to the target echo signal.

Still another object of the invention is the method of blocking jamming signals to a radar system and for providing substantially complete cancellation of the jamming signals without reducing the gain of the desired echo signal.

Other objects, advantages and novel features of the invention will become apparent from the following detailed description of the invention when considered in conjunction with the accompanying drawings wherein.

Figure 2:
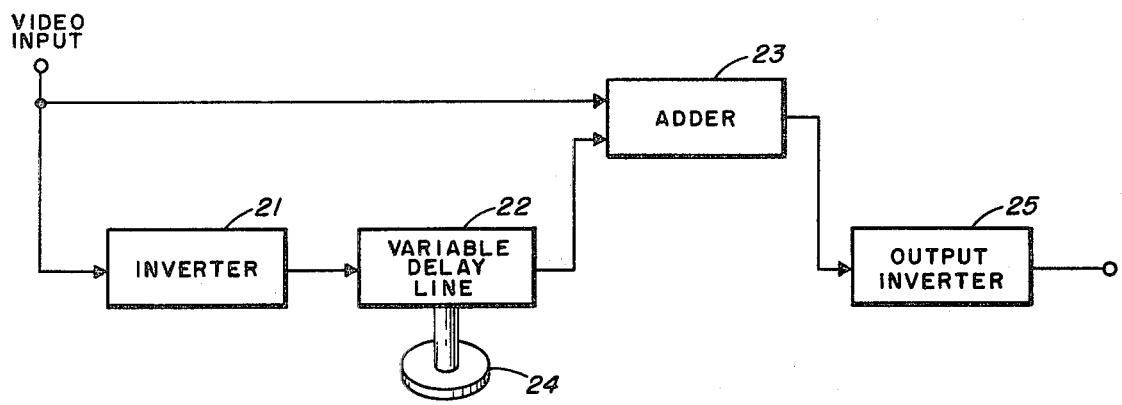
FIG. 2 is a simplified block diagram used to illustrate the electronic circuitry network interrelationship for suppression of jamming signals.

With reference to FIG. 2, there is shown a simplified block diagram of the cancellation system apparatus. Shown is a video signal input which has both the interfering and target information signals fed to adder 23 which has two input circuits. One input circuit feeds the video signal input directly into the adder 23 and the other input circuit delays (variable delay line network 22) and inverts (inverter network 21) the video signal input before feeding it into the adder 23. The adder circuit 23 combines the video signal input from the radar receiver (not shown) with the video signal input which has been inverted and delayed. The output of adder 23 is fed into an output inverter 25 which inverts the signal remaining after combining the two signals in the adder 23. The variable delay line 22 is equipped for manual time delay adjustment by switch 24 which may be adjusted to vary the delay time of the video signal input for obtaining the best cancellation of interfering or jamming signals.

Figure 3:
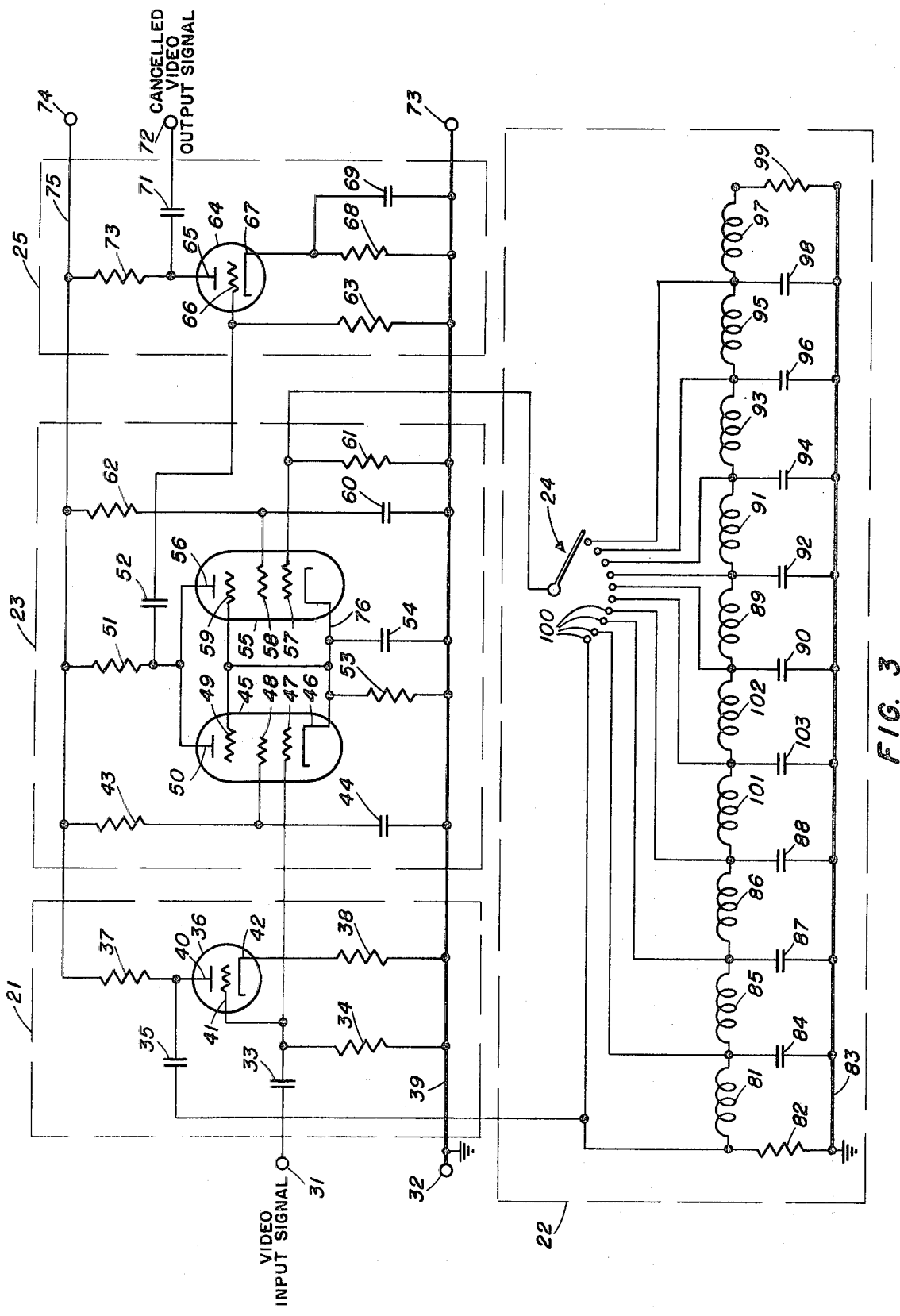
FIG. 3 is an electrical schematic diagram illustrating the electronic components and their circuit interconnection.

Turning now to FIG. 3 of the drawings, there is illustrated a schematic diagram of the cancellation system apparatus. Blocks 21, 22, 23 and 25 representative of diagram blocks of FIG. 2 have been sketched over the schematic of FIG. 3 in order to illustrate the interfunctional relationship of the electronic circuitry contained therein. Video input signals received from the radar receiver are fed across input terminals 31 and 32, respectively. Terminal 32 is connected to ground potential by ground bus 39 and terminal 31 is connected to one side of coupling capacitor 33. The other side of coupling capacitor 33 is connected to grid return resistor 34 and control grid 41 of vacuum tube 36. Also, connected to control grid 41 is control grid 47 of vacuum tube 45. Vacuum tube 36 has a cathode 42, control grid 41, and plate 40. The cathode 42 is connected via a cathode resistor 38 to ground potential by ground bus 39. The plate 40 is connected through plate load resistor 37 to high voltage bus 75 which terminates at high voltage terminal 74. A coupling capacitor 35 is connected at one side to plate 40 and its other side is connected to the input side of the variable delay line 22 as will be more fully explained hereafter.

The adder circuit 23 has two vacuum tubes 45 and 55, respectively, connected in circuit relationship to form a plate adder network. Tube 45 has control grid 47, screen grid 48, suppressor grid 49, plate 50 and cathode 46. The screen grid 48 is connected to the high voltage bus 75 via screen dropping resistor 43. A by-pass capacitor 44 is also connected from screen grid 48 to ground potential bus 39. Tube 55 has tube elements, cathode 76, control grid 57, screen grid 58, suppressor grid 59, and plate 56. The cathodes 46 and 76, respectively, are tied together. Both cathodes 46 and 76 are connected to a common cathode resistor 53 and cathode capacitor 54. One side of cathode resistor 53 and capacitor 54 are connected at ground potential by bus 39 while their other sides are connected to the common connection of the two cathodes 46 and 76. Suppressor grids 49 and 59 also are tied to the common connection of the cathodes 46 and 76, respectively. The screen grid 58 of tube 55 is connected to high voltage bus 75 via screen dropping resistor 62. A by-pass capacitor 60 is connected at one end to screen grid 58 and at its other end to ground potential bus 39. The plates 50 and 56, respectively, of tubes 45 and 55, are connected together by one side of plate load resistor 51; the other side being connected to high voltage bus 75. A coupling capacitor 52 connected at one of its ends to plate load resistor 51 which is connected to plates 50 and 56, respectively, is connected at its other end to the control grid 66 of tube 64.

The delay line represented by block 22 is described as follows. Coupling capacitor 35 connected at one side to plate 40 of tube 36 is connected at its other side to the connection of inductance 81 and resistance 82. The other end of inductance 81 is tied to capacitor 84 which in turn is connected to ground potential bus 83. Inductances 81, 85, 86, 89, 91, 93, 95, 97, 101 and 102 are all connected in series relationship with respect to one another. One end of inductor 81 is tied to a resistor 82 which is connected at its other end to ground bus 83. The connection between inductances 81 and 85, 85 and 86, 86 and 101, 101 and 102, 102 and 89, 89 and 91, 91 and 93, and 95, 95 and 97, respectively, are connected to ground bus 83 via capacitors 84, 87, 88, 103, 90, 92, 94, 96 and 98, respectively. Inductor 97 is connected at one side to load resistance 99 which has its other side connected to ground bus 83. All of the delay line sections are connected via electrical leads, not numbered, to manual switch terminals 100 of switch arm 24. Switch arm 24 is electrically connected to control grid 57 of tube 55. A grid return resistor 61 also connects to control grid 57 and has its other end connected to ground bus 39.

With reference to diagram block 25 and with respect to the circuitry shown therein; a coupling capacitor 52 is connected to the plate side of resistor 51 and has its other side connected to control grid 66. Vacuum tube 64 has a cathode 67, a control grid 66 and a plate 65. The control grid is tied to ground bus 39 via a grid return resistor 63. Cathode biasing resistor 68 and associated cathode by-passing capacitor 69 connect the cathode to ground bus 39 in the conventional manner. Plate 65 is connected to high voltage bus 75 via load resistor 73. Connected to the plate end of load resistor 73 is a coupling capacitor 71 which has its other side connected to output terminal 72. The other ouput terminal 73 is connected to ground bus 39.

Figure 1:
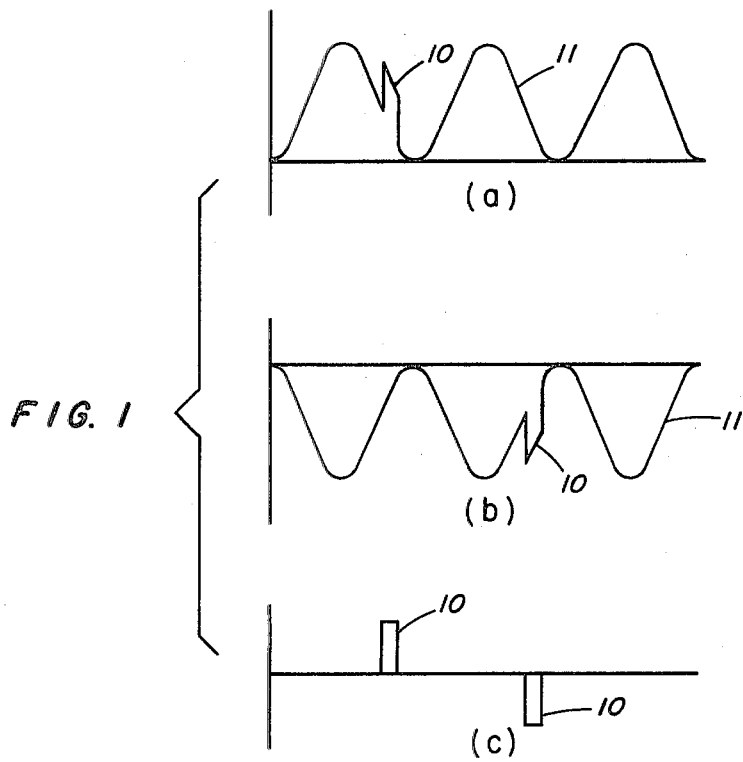
FIGS. 1 (a, b and c) are a series of video signals which contain both echo signal and jamming information for illustrating the performance of the invention.

The operation of the canceling system apparatus is best explained with reference to FIG. 3. As a video input signal is received from a radar receiver (not shown) it appears across terminal 31 and 32. This video input signal, containing both the target echo information 10 and the interfering signals 11, best shown in FIG. 1a is coupled to the control grid 47 of vacuum tube 45 in the adder circuit 23 and is also coupled to control grid 41 of vacuum tube 36 in the inverter circuit 21. The video input signal containing both signal and jamming information thereon is amplified and inverted by inverter circuit 21. This amplified and inverted video input signal is fed via coupling capacitor 35 to variable delay circuitry 22. The signal and jamming information signal will be referred to hereinafter as the video signal. The inverted and delayed video signal, best shown in FIG. 1b, is fed via electrical leads to the contacts of switch arm 24. The amount of delay desired is controlled by manual switch arm 24 which connects with switch contacts 100. The operator turns this switch manually to choose a delay section or a number of delay sections which have a minimum delay equal to or greater than the signal pulse width of the desired signal and a maximum additional delay equal to or greater than one-half of the period of the lowest interfering modulation frequency or jamming signal. As many taps as desired may be provided in the delay line network 22 to maximize the resolution of the video signal for optimum jamming signal cancellation. The video signal fed from switch arm 24 to control grid 57 of tube 55 is representative of the signal shown in FIG. 1b. This inverted and delayed video signal and the undelayed video signal on control grid of 47, of tube 45, are added together in the plate circuit of adder 23. It now becomes apparent that the video signal to the control grid 57 of vacuum 55 is manually controlled by switch 24 so that it is inverted and delayed by a desired amount in order that any periodic jamming modulation present on the video signal will be 180° out of phase from that video signal which is applied directly to the control grid 47 of vacuum tube 45. The output signal from the plate adder is coupled via coupling capacitor 52 so that it appears across grid return resistor 63 of control grid 66. This output signal is representative of that signal shown in FIG. 1c of the drawings. Vacuum tube 64 inverts and amplifies the output signal, shown by FIG. 1c, so that the video target echo signal polarity will be the same as the input signal polarity. This signal is then fed through coupling capacitor 71 to the video output terminals 72 and 73, respectively. Thus, the video output signal appearing across the video output terminals 72 and 73, respectively, will be inverted by vacuum tube 64 so that the video polarity appearing across the output terminals of the cancellation system apparatus will be the same as that which was applied to it.

The jamming cancellation video output signal which has both positive and negative going pulses is now completely free of interference. The extraneous negative going pulse 10, see FIG. 1c, in the signal output may be clipped off if desired by conventional circuitry, not shown.

In summary, the fundamental operating principles of the jamming cancellation apparatus is to cancel the interfering or jamming signals by inverting the video input signal from the radar receiver, sending it through a delay line which is manually adjustable, and adding the delayed video signal to the undelayed video signal in proper phase relationship with each other to effect complete cancellation of any periodic interference without effecting the video echo information present on the video signal.

Obviously many modifications and variations of the present invention are possible in the light of the above teachings. It is therefore to be understood that within the scope of the appended claims the invention may be practiced otherwise than as specifically described.

What is claimed is:

1. An apparatus for removing interference from a radar video signal having signal information and jamming information to thereby improve radar receiver performance comprising:
   a video signal input means;
   a first channel electrically coupled to said video signal input means;
   a second channel electrically coupled to said video signal means;
   said second channel having an inverter circuit for providing polarity inverted signals followed by a variable delay circuit adjusted to delay the radar video signal equal to or greater than one half the period of the lowest interfering modulation signal frequency;
   an adder means coupled to receive output signals from said first and said second channels;
   said adder circuit combining said first video signal and the output from said delay circuit for providing cancellation of out of phase waveform components; and
   output inverter means coupled to receive the video signal from said adder circuit for providing correct phasing of said signal information.

2. An apparatus for removing interference from a radar video signal having signal information and jamming information to thereby improve radar receiver performance comprising:
   a video signal input means;
   an adder circuit having a first and second input means;
   a first video signal electrically coupled to said first input means;
   an inverter circuit electrically coupled to receive a video signal from said video signal input means for providing an amplified and inverted video signal output;
   a delay means coupled to the output of said inverter circuit means and said second input means to delay the radar video signal equal to or greater than one half the period of the jamming information;
   said delay means coupled to said second input means;
   said adder circuit combining said first video signal and the output from said delay means for providing complete cancellation of out of phase waveform components; and
   output inverter means coupled to receive the video signal from said adder circuit for providing correct phasing of said signal information.

3. An apparatus for removing interference from a radar video signal having signal information and jamming information to thereby improve radar receiver performance comprising:
   a video signal input means;
   a first amplifier and inverter circuit coupled to said video signal input means for changing said video signal input polarity;
   a variable delay line coupled to said first amplifier and said inverter circuit;
   an adder circuit having first and second input terminals and an output terminal;
   said variable delay line coupled to said first input terminal; and
   an electrical means coupling said video signal input means to said second input terminals;
   whereby the two video signals are combined in the adder circuit in proper phase relationship with each other to effect complete cancellation of any periodic jamming signal thereby providing only the signal information at said adder output.

4. The apparatus of claim 3 wherein:
   the said output terminal comprises a second amplifier and inverter circuit for providing a signal information output of the same polarity as the input signal information polarity.

5. A method of canceling out interfering modulations present in a radar video signal without causing degradation to the desired signal information comprising the steps of:
   inverting the polarity of a video signal that has interfering modulations present;
   delaying the polarity inverted video signal by manual adjustment equal to or greater than one-half the period of the lowest interfering modulation signal frequency; and
   adding the delayed and polarity inverted signal to an undelayed video signal in proper phase relationship with each other to effect complete cancellation of the interfering modulations.

* * * * *